United States Patent
Gaither

(10) Patent No.: US 6,175,980 B1
(45) Date of Patent: Jan. 23, 2001

(54) ERGONOMIC SEAT CUSHION FOR REDUCING AND ABSORBING SHOCK AND VIBRATION

(76) Inventor: Alma Gaither, 3699 G. 4 Rd., Palisade, CO (US) 81526

(*) Notice: Under 35 U.S.C. 154(b), the term of this patent shall be extended for 0 days.

(21) Appl. No.: 09/234,744

(22) Filed: Jan. 21, 1999

(51) Int. Cl.[7] .............................. A47C 7/18; A47C 16/00
(52) U.S. Cl. .............................. 5/654; 5/740; 297/228.12
(58) Field of Search .............................. 5/740, 653, 654; 297/219.1, 228.12

(56) References Cited

U.S. PATENT DOCUMENTS

| | | | |
|---|---|---|---|
| 2,218,951 | * 10/1940 | Flaharty | 297/228.12 |
| 3,047,888 | * 8/1962 | Shecter et al. | 5/740 X |
| 3,987,507 | * 10/1976 | Hall | 5/653 |
| 4,031,579 | * 6/1977 | Larned | 5/653 X |
| 4,672,700 | * 6/1987 | Poncy | 5/654 |
| 4,712,833 | * 12/1987 | Swanson | 297/228.12 |

FOREIGN PATENT DOCUMENTS

WO 92/10118 * 6/1992 (WO) .................................. 5/653

* cited by examiner

Primary Examiner—Michael F. Trettel
(74) Attorney, Agent, or Firm—Edwin H. Crabtree; Ramon L. Pizavvo; Donald W. Margolis

(57) ABSTRACT

An ergonomic seat cushion for greatly reducing and absorbing shock and isolating vibration even at high frequency ratios. An operator of heavy equipment such as construction vehicles, forklifts, dump trucks, tractors and like vehicles having poor shock absorbing systems can install the cushion on top of an existing seat. The ergonomic seat cushion serves to prevent and limit injuries through the spine, particularly the lower back and reduce neck pain, headaches and overall fatigue. The seat cushion includes a cushion cover with a visco-elastic, liquid-solid pad sandwiched between a pair of closed cell foam pads. The pads are received inside the cushion cover. The cushion cover is made of a water-resistant fabric for both indoor and outdoor use and includes straps for securing the cushion on top of the vehicle's seat. The visco-elastic, liquid-solid pad is constructed of a polyether based polyurethane material. The liquid-solid pad is designed to absorb shock forces and isolate vibration forces and direct the forces perpendicularly away from the original plane of the forces. By using the liquid-solid pad, the shock and vibration forces are reduced by approximately 80 percent. Also, the pad is designed to resist dynamic fatigue and compression set at various operating temperatures. The liquid-solid pad has a hardness in a range of 25–80 durometer and a thickness in a range of ¼ to 1 inch. The cushion may be annular or angular in shape and may be made in different sizes depending on the seat application.

11 Claims, 1 Drawing Sheet

ERGONOMIC SEAT CUSHION FOR REDUCING AND ABSORBING SHOCK AND VIBRATION

BACKGROUND OF THE INVENTION (a) Field of the Invention

This invention relates to seat cushions and the like and more particularly, but not by way of limitation, to a seat cushion used for absorbing shock and isolating vibration when using various types of heavy equipment such as construction vehicles and the like.

(b) Discussion of Prior Art

Heretofore there have been a variety of different types of isolators which have been one-dimensional. By this, the isolators either isolate vibration or absorb shock but not both.

When addressing body related problems due to vibration, an industry term is used called "whole body vibration". This term refers to mechanical energy oscillations, which are transferred to the body as a whole usually through a supporting system such as a seat or platform. Typical exposures to the human body of this type of vibration include automobiles, trucks and operating industrial vehicles. Research has been done to determine the effects of whole body vibration and musculoskeletal disorders such as back pain, sciatic pain, intervertebral disc disorders and herniated disc. The subject invention addresses the above mentioned concerns related to whole body vibration.

In U.S. Pat. No. 5,121,962 to Weber et al., a cushion for absorbing shock and using a piece of visco-elastic material is disclosed. The visco-elastic material is made of a plasticized PVC gel. In U.S. Pat. No. 5,445,858 to Nwoko, an attenuating pad is described for enhancing the capacity for shock absorption. In U.S. Pat. No. 5,749,111 to Pearce, a cushion construction using a gelatinous cushioning media is disclosed. In U.S Pat. No. 5,669,094 to Swanson, a mattress construction is described wherein a layer of visco-elastic foam in combination with latex foam is used.

Also, in U.S. Pat. No. 3,606,463 to Brooks, a seating system is disclosed using a bouncing putty. Further, in U.S. Pat. No. 5,680,662 to Purdy et al. and U.S. Pat. No. 5,737,788 to Castellino et al., a cushioning mattress for reducing shear and friction and a pad for preventing and treating decubitus ulcers are described.

None of the above-mentioned patents incorporate the unique combination of structure and function of the subject ergonomic seat cushion used for both absorbing shock forces and isolating vibration associated with large construction equipment subject to period shock loading and vibration during building construction and similar working conditions.

SUMMARY OF THE INVENTION

In view of the foregoing, it is a primary object of the present invention to provide an ergonomic seat cushion for greatly reducing and absorbing shock and isolating vibration even at high frequency ratios.

Another object of the invention is the seat cushion is readily adapted for use on existing seats of heavy equipment such as construction vehicles, forklifts, dump trucks, forklifts, tractors and like vehicles having poor shock absorbing systems and subject to ongoing shock loading and vibration. Also, the subject seat cushion can be adapted for use on bicycles, motorcycles, saddles and like applications.

Still another important object of the seat cushion is to prevent and limit injuries through the spine, particularly the lower back. Also, the seat cushion is designed to reduce neck pain, headaches and overall fatigue.

A further object of the seat cushion is by using a visco-elastic, liquid-solid pad, shock forces and vibration forces are directed perpendicularly away from the original plane of the forces. The shock loads and vibration forces are reduced by approximately 80 percent. Also, the liquid-solid pad is designed to resist dynamic fatigue and compression set at various operating temperatures.

The ergonomic seat cushion includes a cushion cover with a visco-elastic, liquid-solid pad sandwiched between a pair of closed cell foam pads. The pads are received inside the cushion cover. The cushion cover is made of a water-resistant fabric for both indoor and outdoor use and includes straps for securing the cushion on top of the vehicle's seat. The visco-elastic, liquid-solid pad is constructed of a polyether based polyurethane material. The liquid-solid pad has a hardness in a range of 25–80 durometer and a thickness in a range of ¼ to ⅝ inches. The cushion may be annular or angular in shape and may be made in different sizes depending on the seat application.

These and other objects of the present invention will become apparent to those familiar with the different types seat cushion construction when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
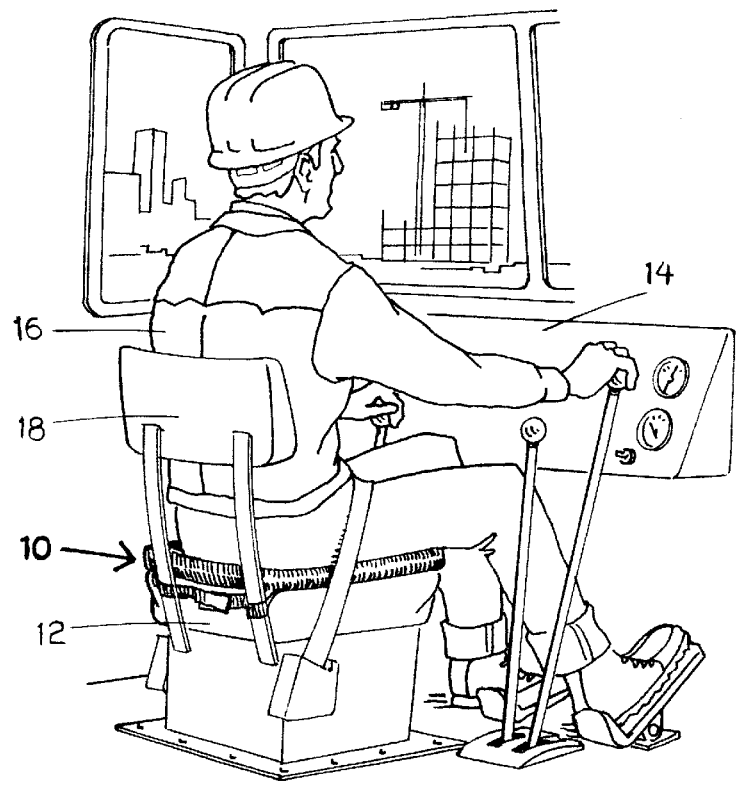
FIG. 1 is a perspective view of the subject ergonomic seat cushion received on a seat of a large loading equipment vehicle used on a construction site during building construction. In this view, a equipment operator is shown sitting on the seat cushion and operating the loading vehicle.

In FIG. 1, a perspective view of the subject ergonomic seat cushion is shown received on a seat 12 of a large loading equipment vehicle 14 used on a construction site during building construction. The ergonomic seat is designated by general reference numeral 10. In this view, a equipment operator 16 is shown sitting on the seat cushion 10 and operating the loading equipment vehicle 14. The loading vehicle 14 and the seat 12, by the nature of the working conditions in and around a construction site, are subject to shock loading and vibration which heretofore was absorbed by the body of the equipment operator 16. The cushion 10 in this drawing is shown secured to a back rest 18 which is part of the seat 12.

Figure 2:
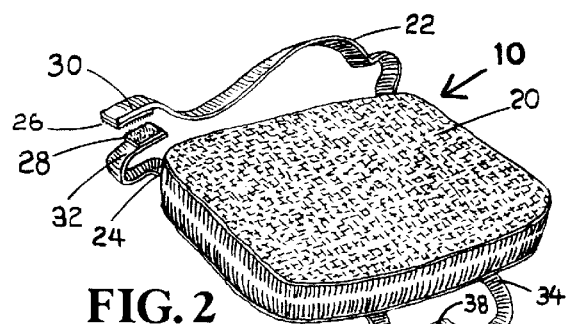
FIG. 2 is a perspective view of the ergonomic seat cushion with a seat cover and having straps for securing the cushion to the back of a seat or to the bottom of the seat.

In FIG. 2, a perspective view of the ergonomic seat cushion 10 is illustrated with a seat cover 20 and having rear straps 22 and 24 with hook fasteners 26 and loop fasteners 28 mounted on ends 30 and 32 of the straps 22 and 24. The hook fasteners 26 and loop fasteners 28 are used for securing the cushion 10 to the back of a seat as shown in FIG. 1. Also the cushion 10 includes front straps 34 and 36 having hook fasteners 26 and loop fasteners 28 mounted on ends 38 and 40 of the straps 34 and 36. The front straps 34 and 36 can be used for securing the cushion 10 to bottom of the front of a seat. The cushion seat cover 20 is made of a water-resistant fabric for both indoor and outdoor use.

Figure 3:
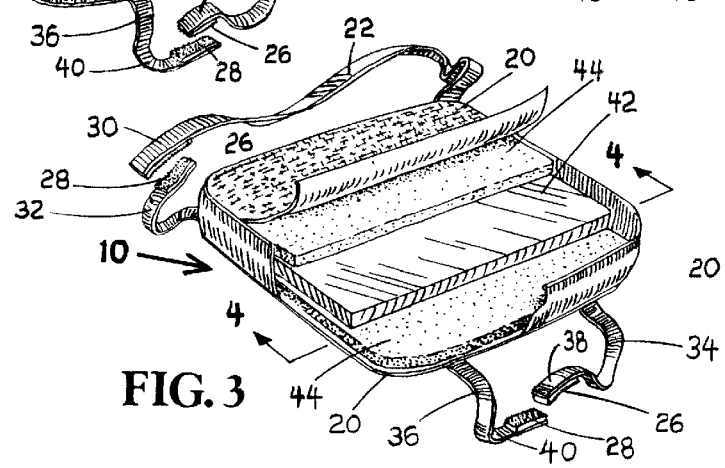
FIG. 3 is another perspective view of the seat cushion with the seat cover cut-away exposing a visco-elastic, liquid-solid pad. The liquid-solid pad is shown sandwiched between a pair of closed cell foam pads.

In FIG. 3, another perspective view of the seat cushion 10 is shown with the seat cover 20 cut-away exposing a visco-elastic, liquid-solid pad 42. The liquid-solid pad 42 is shown sandwiched between a pair of closed cell foam pads 44.

Figure 4:
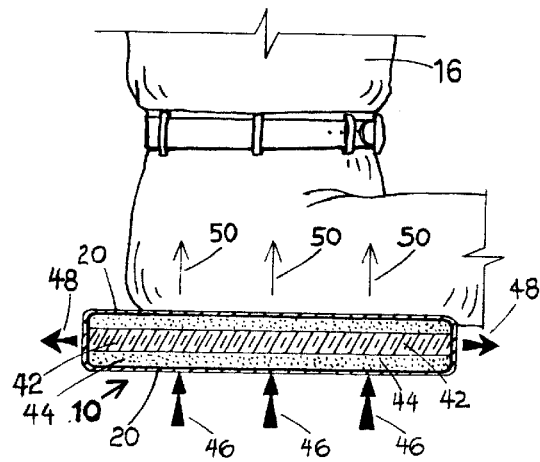
FIG. 4 is a cut-away view of the seat cushion taken along lines 4—4 as shown in FIG.3. In this view, the seat cushion is shown with shock loading on the bottom of the cushion and the majority of the shock loading directed perpendicularly and outwardly from the liquid-solid pad. In this example, only a small portion of the shock force is received by the lower body of the equipment operator.

In FIG. 4, a cut-away view of the seat cushion 10 is illustrated and taken along lines 4—4 as shown in FIG.3. In this view, the seat cushion 10 is shown with shock loading, represented by large arrows 46, delivering a shock load on the bottom of the cushion 10.

The visco-elastic, liquid-solid pad 42 is constructed of a polyether based polyurethane material. The liquid-solid pad 42 is designed to absorb shock forces and isolate vibration forces and direct the forces perpendicularly or at right angles away from the original plane of the forces or in this example, large arrows 46. In this drawing, medium size arrows 48 are shown directing the shock forces outwardly at right angles from the shock forces 46.

For example, if the shock load on the seat cushion 10 is in a range of 100 psi as represented by arrows 46, then the liquid-solid pad 42 will direct the shock force perpendicularly outward and represented by arrows 48. By using the liquid-solid pad 42, the shock and vibration forces are reduced by approximately 80 percent or the arrows 48 represent approximately 80 psi. The remaining force of approximately 20 psi, is absorbed by the equipment operator with this force represented by small arrows 50.

Also, the visco-elastic, liquid-solid pad 42 is designed to resist dynamic fatigue and compression set at various operating temperatures. The liquid-solid pad 42 typically has a hardness in a range of 25–80 durometer and a thickness in a range of ¼ to 1 inches. The cushion 10 may be annular or angular in shape and may be made in different sizes depending on the seat application.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. An ergonomic seat cushion for greatly reducing and absorbing shock and isolating vibration when secured on top of an operator's seat used with heavy operating equipment subject to shock forces and vibration forces, the seat cushion comprising:

a seat cushion cover;

a visco-elastic, liquid-solid pad received inside said cushion cover, said visco-elastic, liquid-solid pad having a hardness in a range of 25–80 durometer; and a pair of closed cell foam pads received inside said cushion cover, said liquid-solid pad sandwiched between said foam pads.

2. The seat cushion as described in claim 1 wherein said visco-elastic, liquid-solid pad has a hardness in a range of 25–80 durometer.

3. The seat cushion as described in claim 1 wherein said liquid-solid pad has a thickness in a range of ¼ to 1 inches.

4. The seat cushion as described in claim 1 wherein said cushion cover is made of a water-resistant fabric for both indoor and outdoor use and includes straps for securing said cushion on top of the operator's seat.

5. An ergonomic seat cushion for greatly reducing and absorbing shock and isolating vibration when secured on top of an operator's seat used with heavy operating equipment subject to shock forces and vibration forces, the seat cushion comprising:

a seat cushion cover;

a visco-elastic, liquid-solid pad received inside said cushion cover, said liquid-solid pad being constructed of a polyether based polyurethane material, whereby said liquid-solid pad is designed to absorb shock forces and isolate vibration forces and direct the forces perpendicularly away from a plane of said liquid-solid pad receiving the forces thereon; and a pair of closed cell foam pads received inside said cushion cover, said liquid-solid pad sandwiched between said foam pads.

6. The seat cushion as described in claim 5 wherein said visco-elastic, liquid-solid pad has a hardness in a range of 25–80 durometer.

7. The seat cushion as described in claim 5 wherein said liquid-solid pad has a thickness in a range of ¼ to 1 inches.

8. The seat cushion as described in claim 5 wherein said liquid-solid pad directs in a range of 70 to 90% of the forces perpendicularly away from the plane of said liquid-solid pad receiving the forces thereon.

9. The seat cushion as described in claim 8 wherein said seat cushion cover includes straps thereon, said straps adapted for securing the seat cushion on top of the operator's seat.

10. An ergonomic seat cushion for greatly reducing and absorbing shock and isolating vibration when secured on top of an operator's seat used with heavy operating equipment subject to shock forces and vibration forces, the seat cushion comprising:

a seat cushion cover;

a visco-elastic, liquid-solid pad received inside said cushion cover, said liquid-solid pad being constructed of a polyether based polyurethane material, whereby said liquid-solid pad is designed to absorb in a range of 70 to 90% of shock forces and vibration forces placed on a plane of said liquid-solid pad, said visco-elastic, liquid-solid pad having a hardness in a range of 25–80 durometer; and a pair of closed cell foam pads received inside said cushion cover, said liquid-solid pad sandwiched between said foam pads.

11. The seat cushion as described in claim 10 wherein said liquid-solid pad directs the forces placed on the plane of said liquid-solid pad perpendicularly away from the original plane of the forces.

* * * * *